United States Patent
Gu

(10) Patent No.: US 12,552,484 B2
(45) Date of Patent: Feb. 17, 2026

(54) CABLE ROUTING ASSEMBLY

(71) Applicant: TIEN HSIN INDUSTRIES CO., LTD., Taichung (TW)

(72) Inventor: Fong-Syuan Gu, Taichung (TW)

(73) Assignee: TIEN HSIN INDUSTRIES CO., LTD., Taichung (TW)

(*) Notice: Subject to any disclaimer, the term of this patent is extended or adjusted under 35 U.S.C. 154(b) by 433 days.

(21) Appl. No.: 18/357,975

(22) Filed: Jul. 24, 2023

(65) Prior Publication Data

US 2024/0400148 A1 Dec. 5, 2024

(30) Foreign Application Priority Data

Jun. 1, 2023 (TW) .................. 112120567

(51) Int. Cl.
*B62J 45/00* (2020.01)
*H02G 3/38* (2006.01)

(52) U.S. Cl.
CPC ............... *B62J 45/00* (2020.02); *H02G 3/28* (2013.01)

(58) Field of Classification Search
CPC .. B62J 45/00; B62J 11/10; H02G 3/28; B62K 21/02; B62K 21/06
See application file for complete search history.

(56) References Cited

U.S. PATENT DOCUMENTS

| | | | |
|---|---|---|---|
| 9,056,646 B1* | 6/2015 | D'Aluisio | B62L 3/00 |
| 9,701,293 B2* | 7/2017 | D'Aluisio | B62K 19/30 |
| 2011/0120256 A1* | 5/2011 | Giroux | B62J 11/13 |
| | | | 74/502.2 |
| 2019/0092417 A1* | 3/2019 | Süsse | B62K 21/02 |
| 2019/0233043 A1* | 8/2019 | Huang | B62K 21/12 |
| 2019/0367121 A1* | 12/2019 | Vandermolen | B62L 3/02 |
| 2021/0061401 A1* | 3/2021 | van Rijckevorsel | B62J 11/10 |
| 2022/0204118 A1* | 6/2022 | King | B62J 11/13 |
| 2023/0067171 A1* | 3/2023 | Brown | B62J 45/20 |
| 2024/0300611 A1* | 9/2024 | Breitfeld | B62K 21/06 |

* cited by examiner

Primary Examiner — Valentin Neacsu
Assistant Examiner — Marlon A Arce
(74) Attorney, Agent, or Firm — Apex Juris, pllc; Hilde M. L. Coeckx

(57) ABSTRACT

A cable routing assembly, disposed on a headset of a bicycle and having a through hole fitting around a steerer tube of the bicycle, includes a top annular base having a first through hole and a first cable groove and a bottom annular base having a second through hole and a second cable groove. When the top annular base is engaged with the bottom annular base, the top annular base and the bottom annular base jointly form an internal space, and the first cable groove and the second cable groove jointly surround to form a cable channel communicating between an external space and the internal space. The first through hole communicates with the second through hole to form the through hole. An axial direction and a channel direction that are not parallel are defined. The through hole extends along the axial direction. The cable channel extends along the channel direction.

12 Claims, 10 Drawing Sheets

CABLE ROUTING ASSEMBLY

BACKGROUND OF THE INVENTION

Technical Field

The present disclosure relates generally to a bicycle, and more particularly to a cable routing assembly of a bicycle.

Description of Related Art

Generally, a bicycle controls mechanisms at different positions to operate through different cables or electric wires, and a conventional cable is exposed outside a frame. However, when the cable is disposed outside the frame, not only an appearance of the bicycle is affected, but also the cable is easily in contact with or tangled with an external object, which causes safety issues.

Therefore, in order to solve the aforementioned problem, a conventional cable routing base is generally disposed on a headset and is for the cable to pass through. After the cable enters the cable routing base, the cable could enter an inside of a head tube, thereby achieving the effect of positioning and hiding the cable.

However, the conventional cable routing base generally has a plurality of cable holes communicating with a receiving space in a base, and the cable is required to pass through the cable holes and then the cable routing base is mounted on the headset, so that a direction of the cable after passing through the cable holes cannot be easily determined, thereby inconducive to assembling. Additionally, a foreign object, such as moisture or dust, of an external space can easily enter the cable routing base through the cable holes, wherein the foreign objected entered the cable routing base cannot be easily removed. Therefore, the conventional cable routing base still has room for improvements.

BRIEF SUMMARY OF THE INVENTION

In view of the above, the primary objective of the present disclosure is to provide a cable routing assembly that is conducive to assembling and positioning.

The present disclosure provides a cable routing assembly disposed on a headset of a bicycle and having a through hole fitting around a steerer tube of the bicycle. The cable routing assembly includes a top annular base and a bottom annular base. The top annular base has a first through hole and a first cable groove. The bottom annular base has a second through hole and a second cable groove. When the top annular base is engaged with the bottom annular base, the top annular base and the bottom annular base jointly form an internal space, and the first cable groove and the second cable groove jointly surround to form a cable channel, wherein the cable channel communicates between an external space and the internal space. The first through hole and the second through hole communicate with each other to form the through hole of the cable routing assembly. An axial direction and a channel direction are respectively defined. The through hole of the cable routing assembly extends along the axial direction. The cable channel extends along the channel direction. The axial direction and the channel direction are not parallel to each other.

With the aforementioned design, the top annular base and the bottom annular base are a two-piece design, so that the cable could pass through and be positioned in the second cable groove and then the top annular base is engaged with the bottom annular base, thereby solving the problem of the conventional cable routing assembly that is inconducive to assembling. Additionally, as the axial direction and the channel direction are not parallel to each other, the foreign object, such as moisture or dust, of the external space could not easily enter the cable routing assembly through the cable channel.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
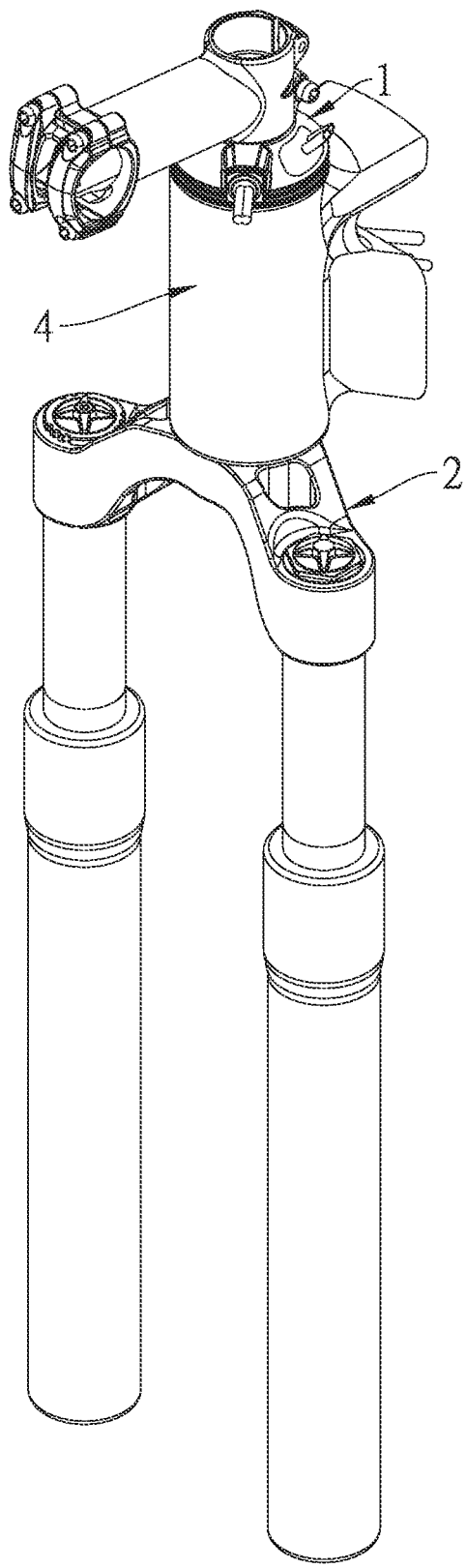
FIG. 1 is a perspective view, showing the cable routing assembly being mounted on the headset of the bicycle according to an embodiment of the present disclosure.
Figure 2:
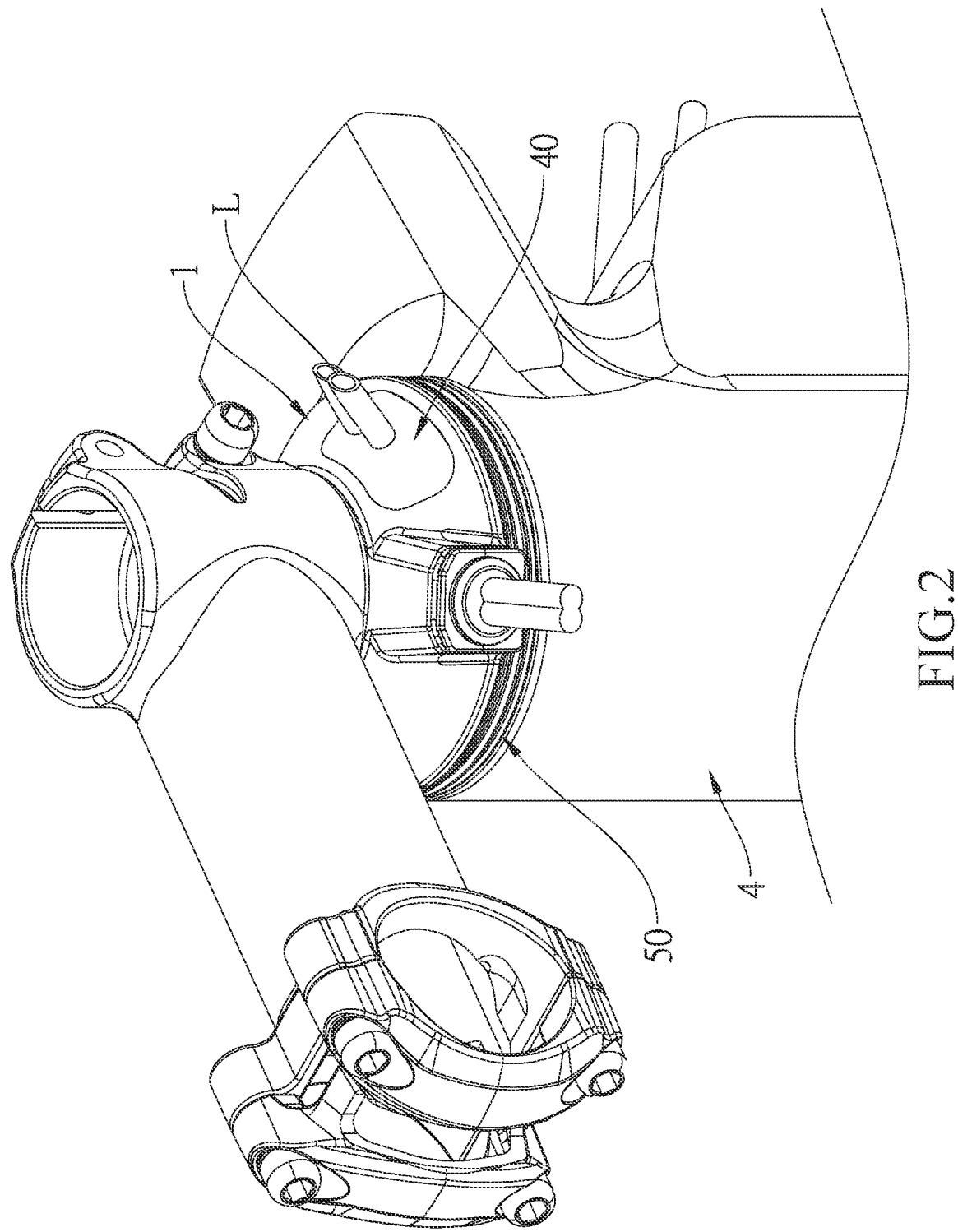
FIG. 2 is an enlarged perspective view, showing a top portion of headset of the bicycle in FIG. 1 according to the embodiment of the present disclosure.
Figure 3:
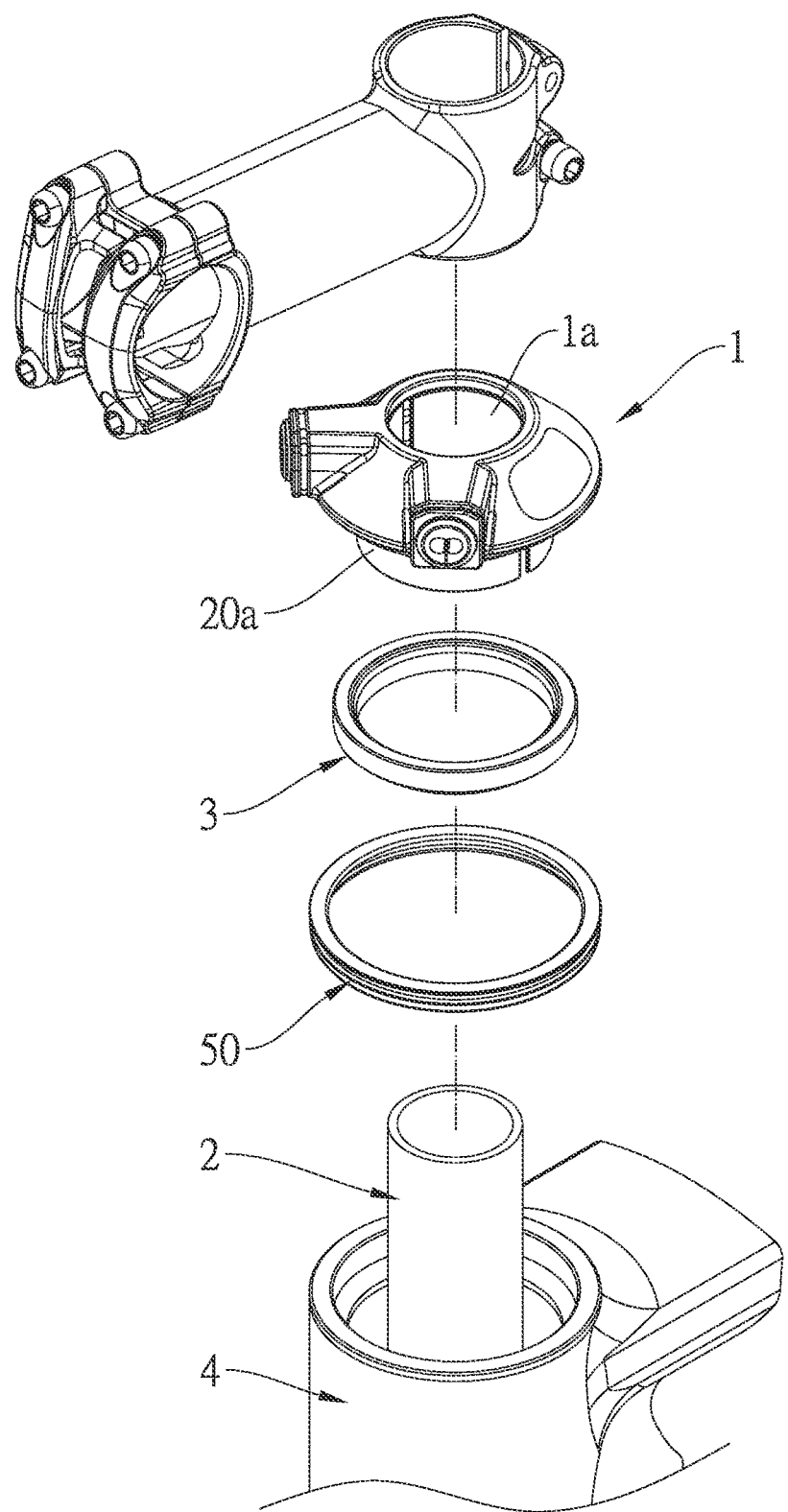
FIG. 3 is a schematic view, showing a part of the cable routing assembly being separated according to the embodiment of the present disclosure.
Figure 4:
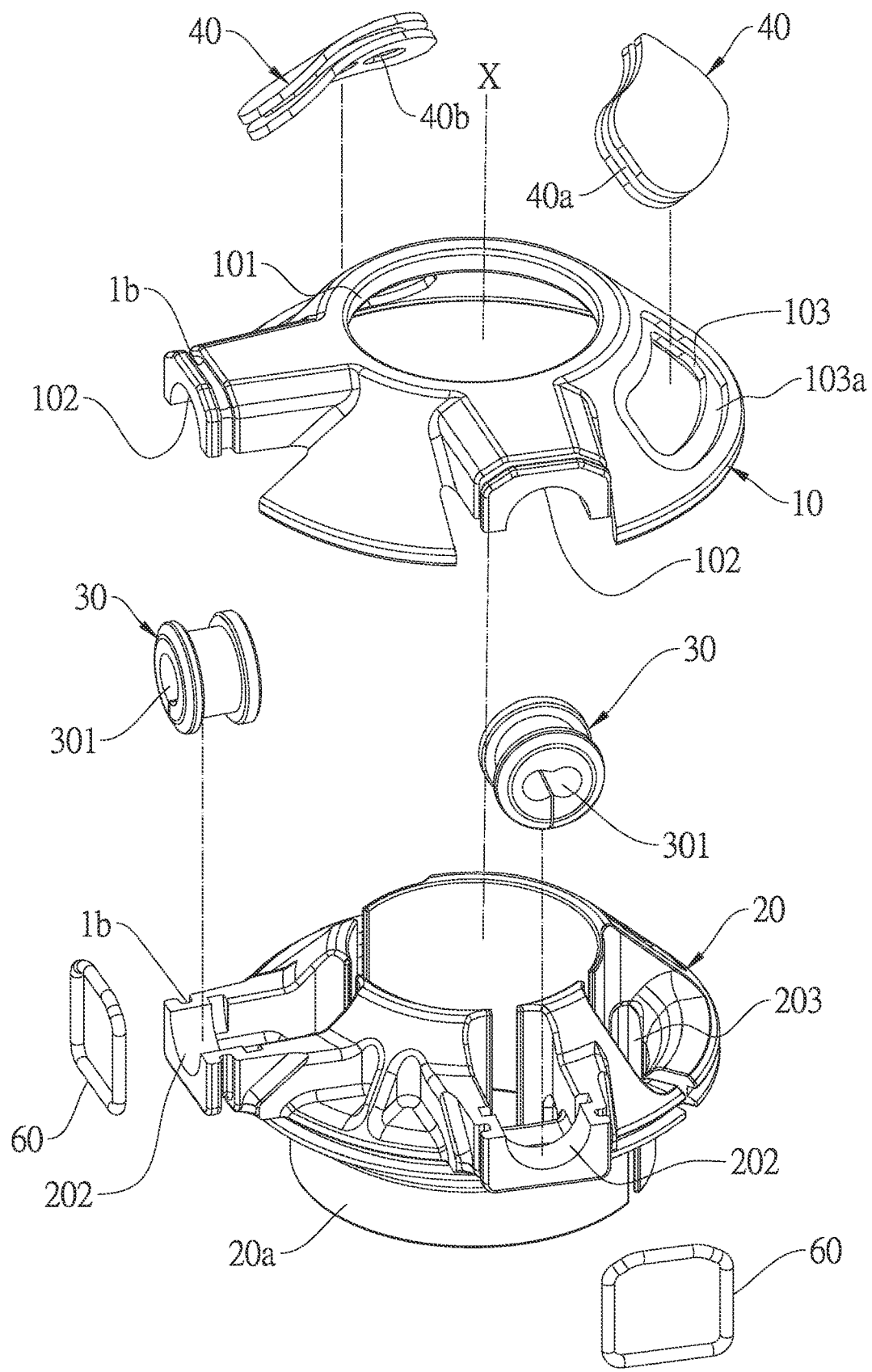
FIG. 4 is a schematic view, showing a part of the cable routing assembly being exploded according to the embodiment of the present disclosure.

A cable routing assembly 1 according to an embodiment of the present disclosure is illustrated in FIG. 1 to FIG. 10. The cable routing assembly 1 is disposed on a headset of a bicycle and has a through hole 1a fitting around a steerer tube 2 of a fork of the bicycle. As shown in FIG. 3 and FIG. 4, the cable routing assembly 1 includes a top annular base 10 and a bottom annular base 20. A side of the bottom annular base 20 away from the top annular base 10 has an extending portion 20a, wherein the extending portion 20a extends away from the top annular base 10 along an axial direction X and passes through and urges an inner annular wall of a bearing 3.

Figure 8:
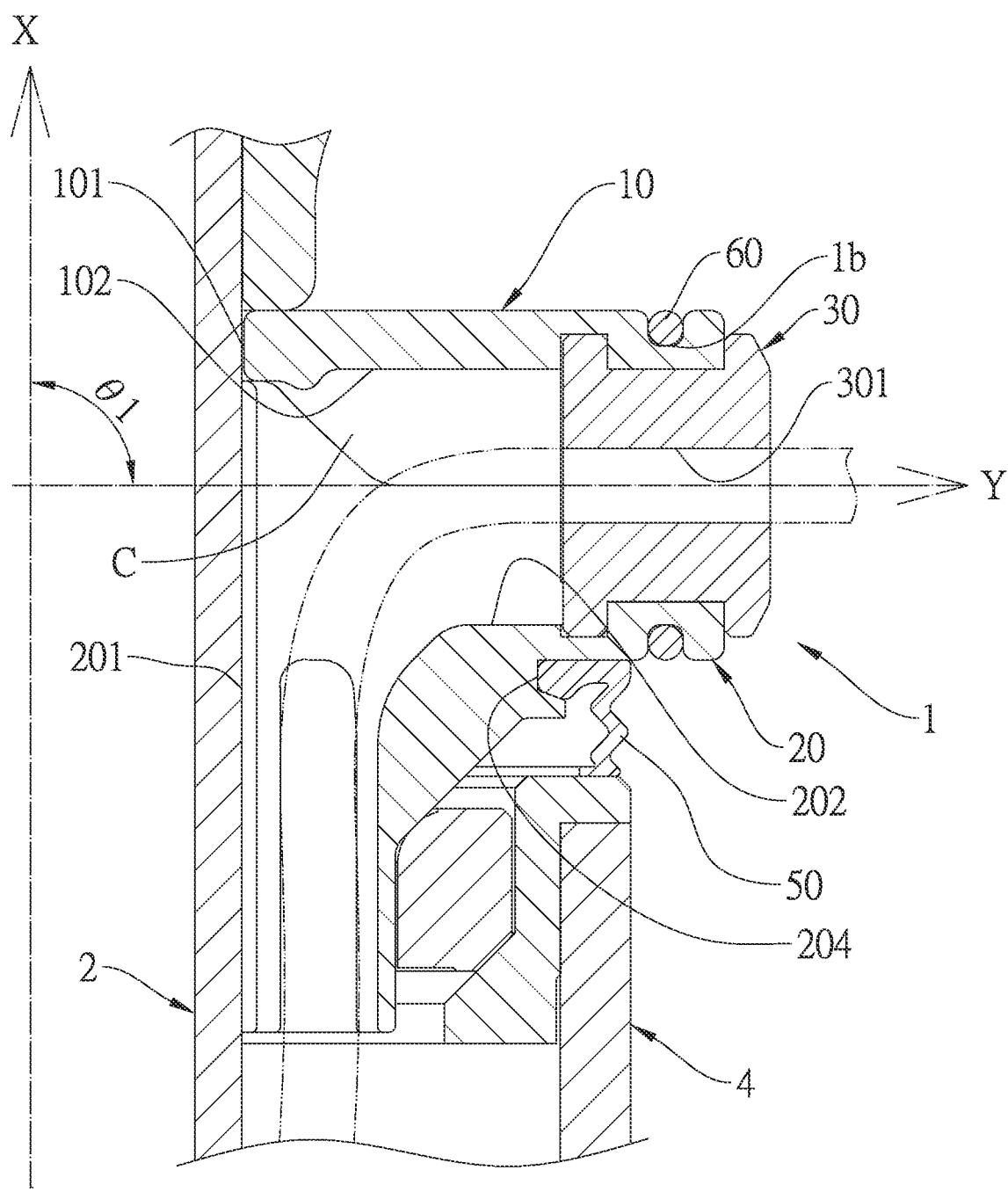
FIG. 8 is a sectional view along the 8-8 line in FIG. 6.

As shown in FIG. 4 to FIG. 8, the top annular base 10 has a first through hole 101 and a first cable groove 102. The bottom annular base 20 has a second through hole 201 and a second cable groove 202. When the top annular base 10 is engaged with the bottom annular base 20, the top annular base 10 and the bottom annular base 20 jointly form an internal space, and the first cable groove 102 and the second cable groove 202 jointly surround to form a cable channel C as shown in FIG. 8. The cable channel C communicates between an external space and the internal space. The first through hole 101 and the second through hole 201 communicates with each other to form the through hole 1a of the cable routing assembly 1. In this way, when a cable L, such as an electric wire or a shifting cable, is installed, firstly the cable L could be disposed and positioned in the second cable groove 202, and then the top annular base 10 is engaged with the bottom annular base 20, so that the cable L is accommodated in the cable channel C; when the cable L is disposed and positioned in the second cable groove 202, a direction of the cable L could be clearly seen, thereby conducive to assembling.

A channel direction Y is defined. The through hole 1a of the cable routing assembly 1 extends along the axial direction X. The cable channel C extends along the channel direction Y. The axial direction X and the channel direction Y are not parallel to each other. In this way, a foreign object, such as moisture and dust, of the external space could not easily enter the cable routing assembly 1 through the cable channel C. A first angle θ1 formed between the axial direction X and the channel direction Y satisfies a condition of being greater than or equal to 10° and being less than or equal to 170°. Preferably, the first angle θ1 formed between the axial direction X and the channel direction Y could be greater than or equal to 45° and be less than or equal to 135°. In the current embodiment, the first angle θ1 formed between the axial direction X and the channel direction Y is 90° as an example, but not limited thereto.

Figure 9:
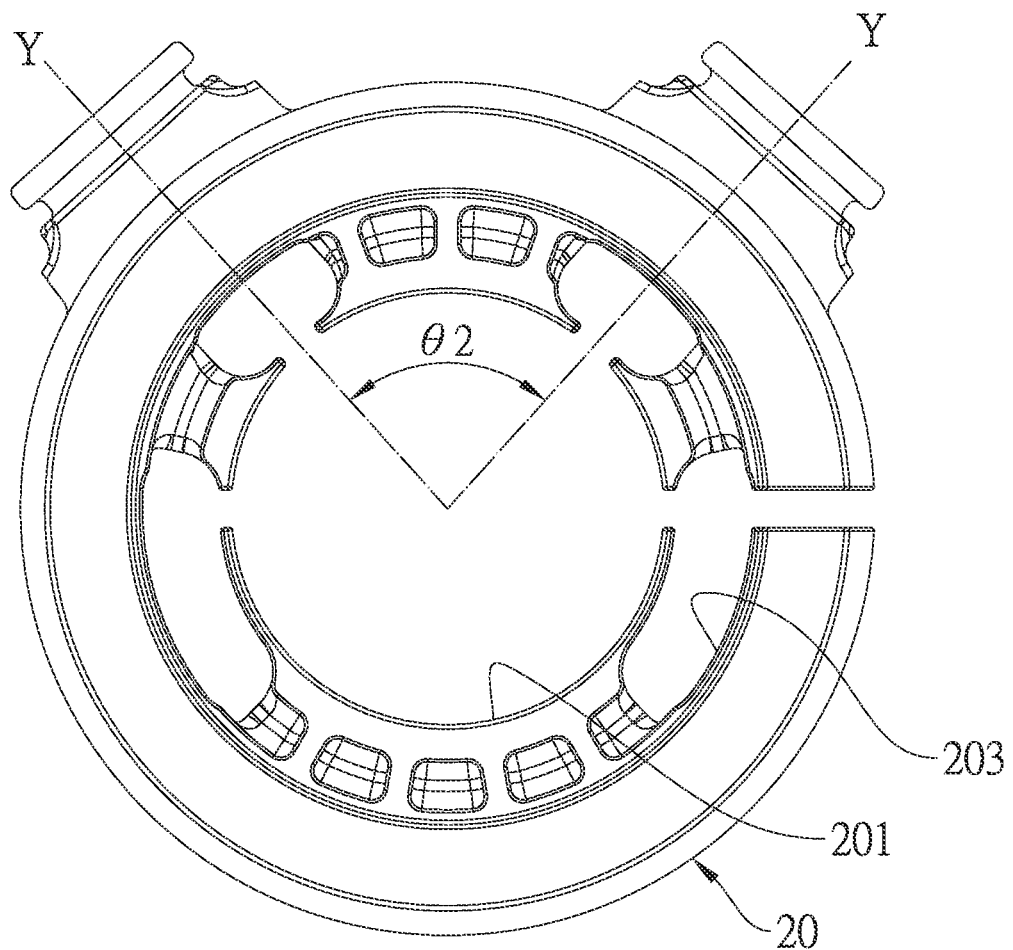
FIG. 9 is a bottom view of the bottom annular base according to the embodiment of the present disclosure.
Figure 10:
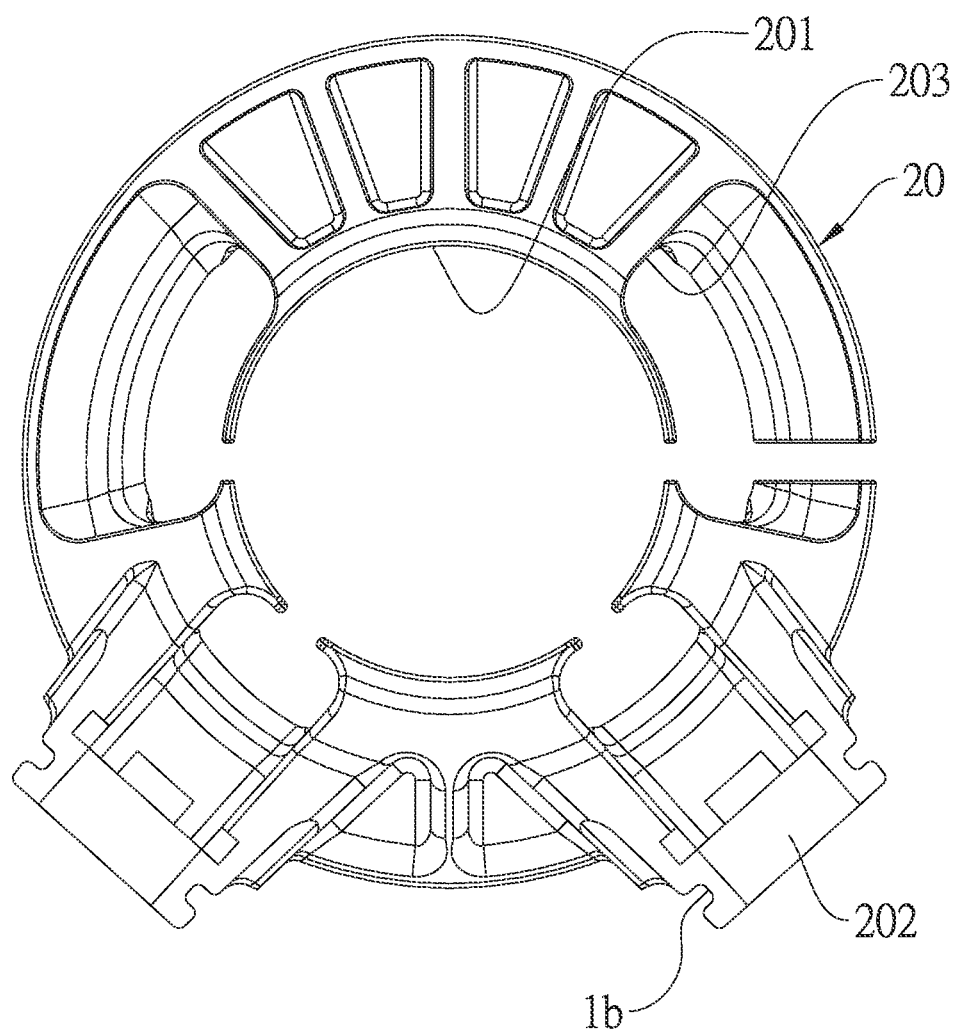
FIG. 10 is a top view of the bottom annular base according to the embodiment of the present disclosure.

In the current embodiment, the number of the first cable groove 102 is two, and the number of the second cable groove 202 correspondingly is two as an example. When the top annular base 10 is engaged with the bottom annular base 20, two cable channels C are formed, wherein a second angle θ2 formed between the channel directions Y of the two cable channels C satisfies a condition of being less than or equal to 175° as shown in FIG. 9. In other embodiment, the number of the first cable groove 102 could be one, two, or more, and the number of the second cable groove 202 could correspondingly be one, two, or more, which also achieve the effect of being conducive to assembling and preventing the foreign object, such as moisture or dust, of the external space from entering the cable routing assembly 1 through the cable channel C.

As shown in FIG. 4 and FIG. 8, the cable routing assembly 1 further includes a first plug 30 clamped between the first cable groove 102 and the second cable groove 202. The first plug 30 is disposed in an opening of the cable channel C communicating with the external space, wherein the first plug 30 has a through hole 301 communicating between the cable channel C and the external space, so that the cable L, such as the electric wire or the shifting cable, could pass through the first plug 30 and enter the internal space of the cable routing assembly 1 through the cable channel C.

In the current embodiment, the first plug 30 is made of waterproof rubber material, the number of the through hole 301 of the first plug 30 corresponds to the number of the cable L, and a diameter of the through hole 301 of the first plug 30 matches with an outer diameter of the cable L; in this way, the first plug 30 could be tightly matched with the cable L, so that a sealing effect could be enhanced, thereby preventing the foreign object, such as moisture or dust, of the external space from entering the cable routing assembly 1 through the cable channel C. In other embodiments, the first plug 30 could be disposed without the through hole 301 of the first plug 30; in this way, when the cable L is not disposed, the first plug 30 could completely block the cable channel C; when the cable L is disposed, the through hole 301 of the first plug 30 could be formed by using tools or directly penetrating the first plug 30 with the cable L.

Figure 5:
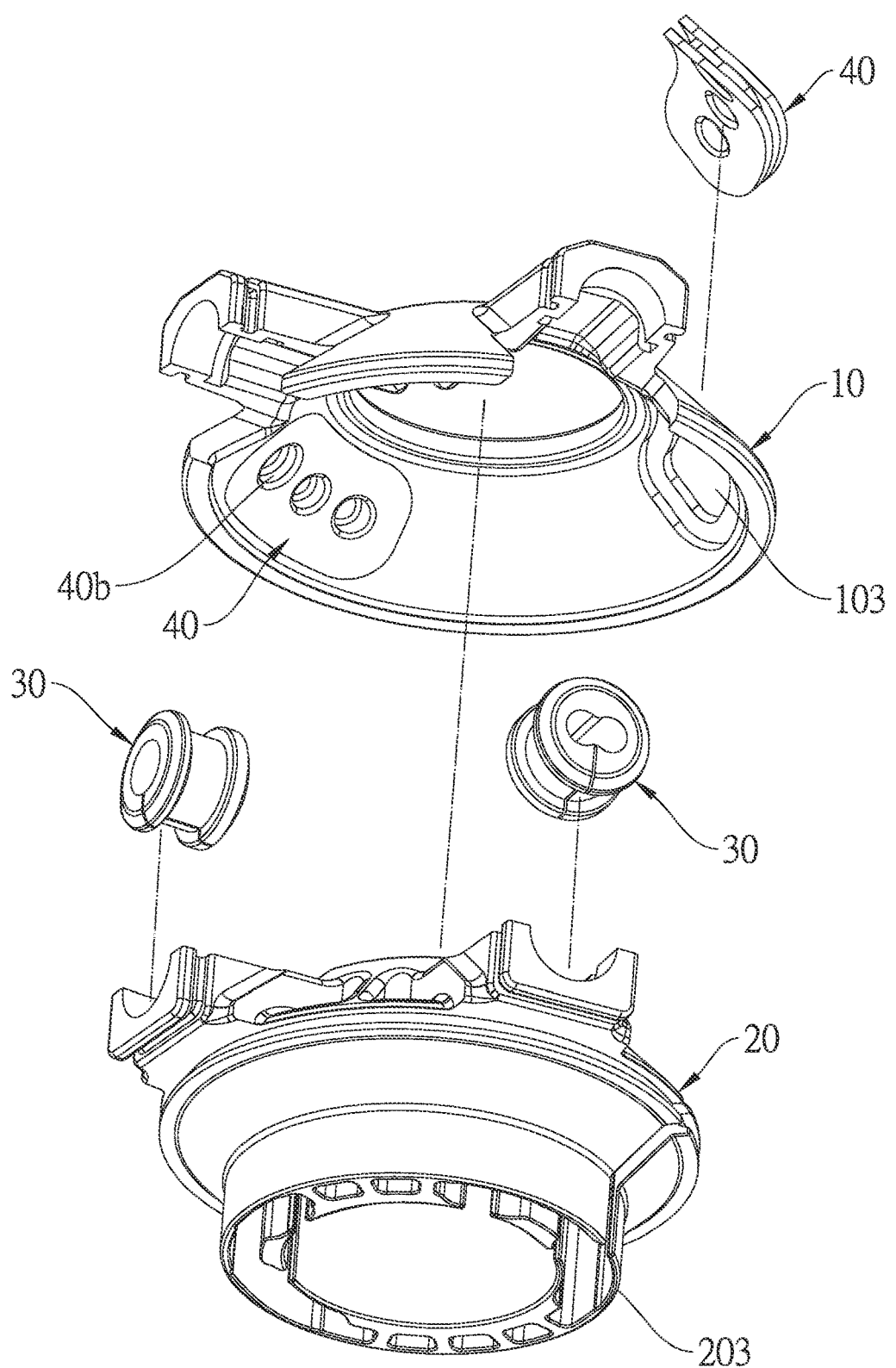
FIG. 5 is an exploded schematic view, showing the fourth through hole of the cable routing assembly according to the embodiment of the present disclosure.
Figure 6:
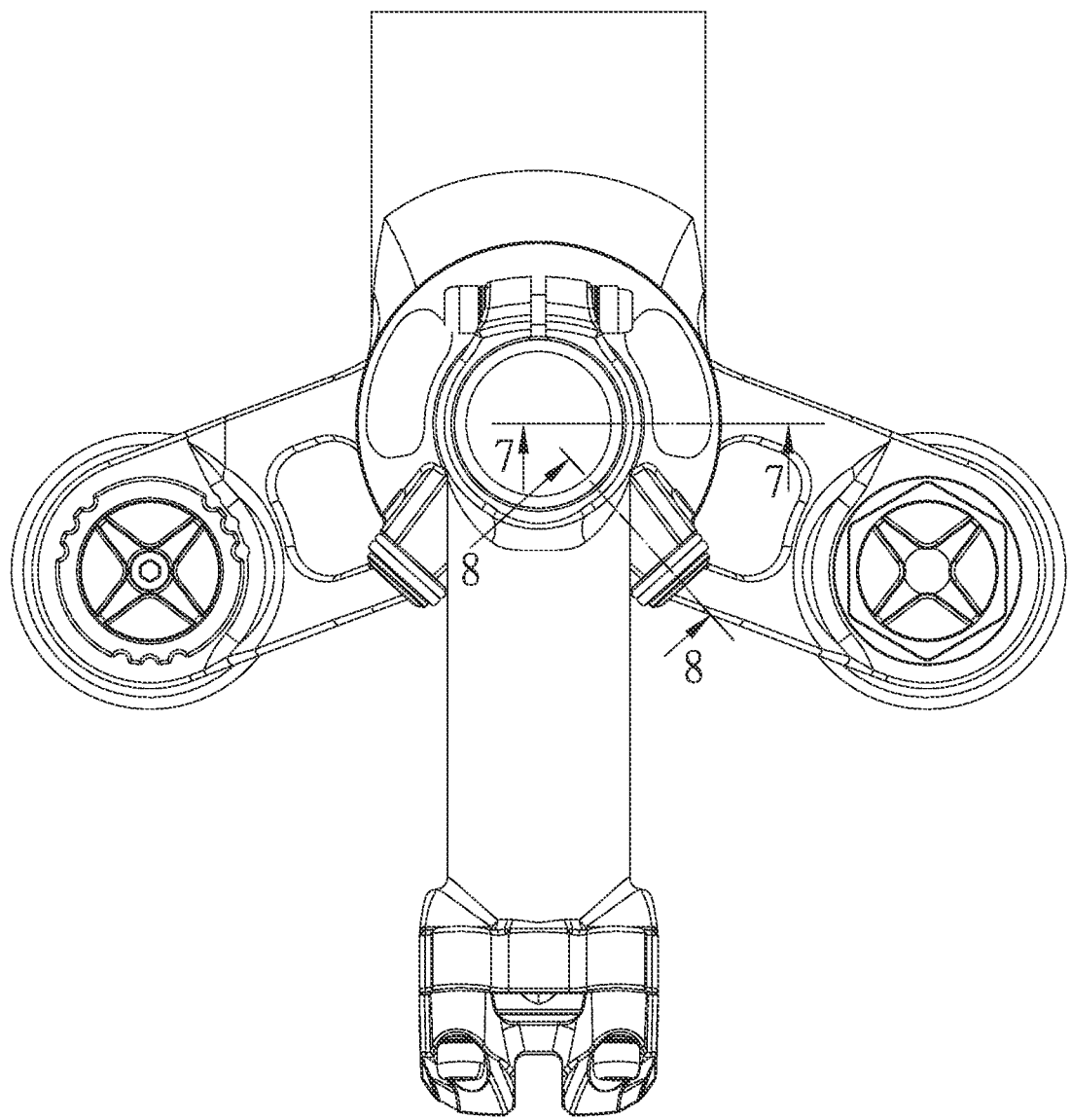
FIG. 6 is a top view, showing the cable routing assembly being mounted on the headset of the bicycle according to the embodiment of the present disclosure.
Figure 7:
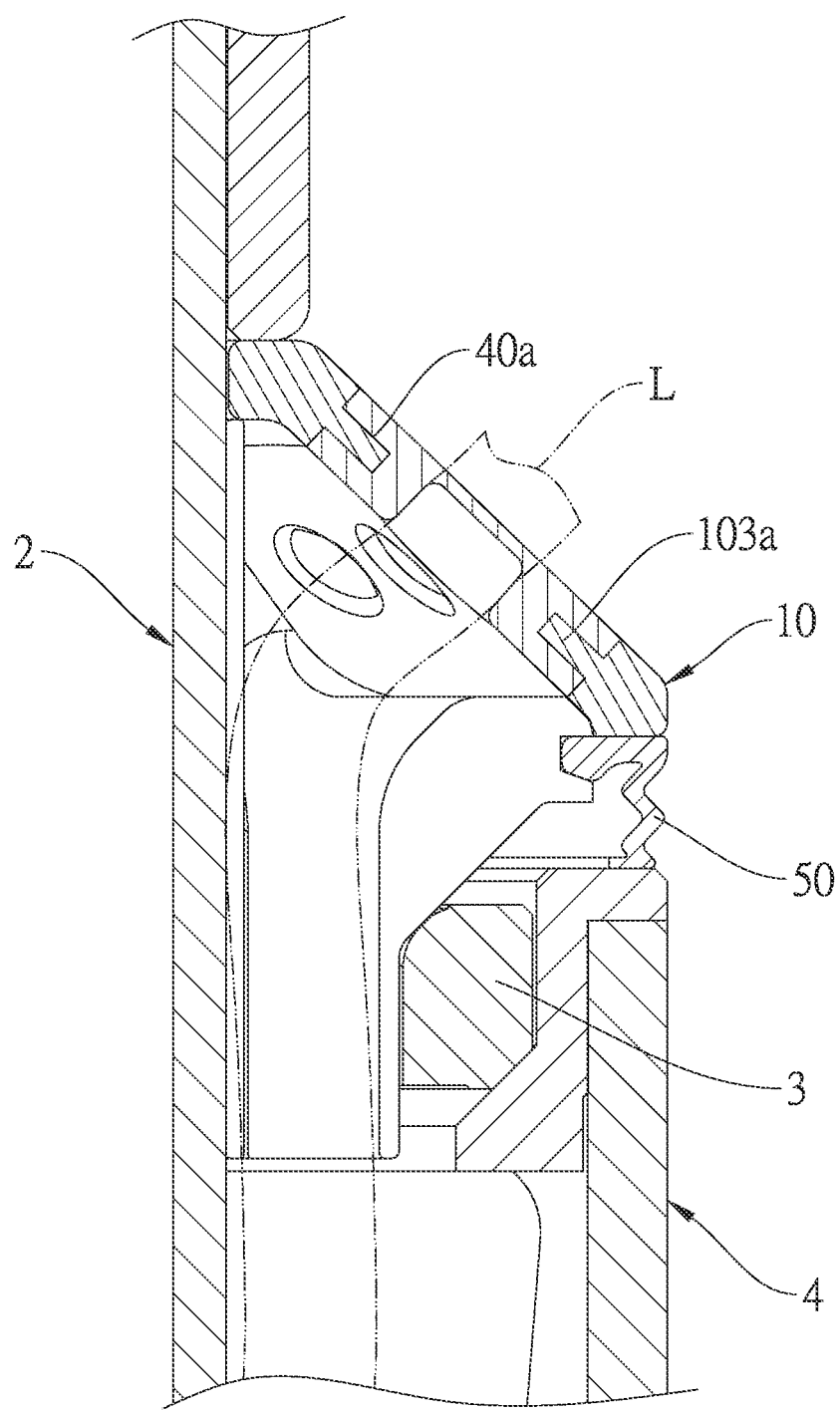
FIG. 7 is a sectional view along the 7-7 line in FIG. 6.

Additionally, referring to FIG. 4 and FIG. 5, a groove wall of the first cable groove 102 and a groove wall of the second cable groove 202 respectively match with an outer contour of the first plug 30, so that the first plug 30 could be quickly mounted and positioned between the first cable groove 102 and the second cable groove 202, and the first plug 30 could not easily move relative to the first cable groove 102 and the second cable groove 202 when the top annular base 10 is engaged with the bottom annular base 20.

As shown in FIG. 4 and FIG. 5, the top annular base 10 has a third through hole 103 communicating between the external space and the internal space. The bottom annular base 20 has a fourth through hole 203 corresponding to the third through hole 103 and communicating between the external space and the internal space. When the top annular base 10 is engaged with the bottom annular base 20, the third through hole 103 communicates with the fourth through hole 203, so that the cable L, such as a brake fluid hose, could pass through the third through hole 103 and the fourth through hole 203 to enter a space between a head tube 4 of the bicycle and the steerer tube 2 of the fork.

The cable routing assembly 1 further includes a second plug 40 detachably engaged with the third through hole 103 of the top annular base 10, so that when the cable L is not disposed, the second plug 40 could be disposed in the third through hole 103 of the top annular base 10 to block the third through hole 103, thereby preventing the foreign object, such as moisture and dust, of the external space from entering the cable routing assembly 1 through the third through hole 103. Additionally, referring to FIG. 7, an inner peripheral edge of the third through hole 103 has a protrusion 103a that is annular, and an outer peripheral edge of the second plug 40 has a recess 40a matching with the protrusion 103a that is annular, so that the second plug 40 could be detachably mounted in the third through hole 103 of the top annular base 10.

In the current embodiment, the second plug 40 is made of waterproof rubber material, and a side of the second plug 40 facing the internal space has a plurality of recesses 40b respectively matching with the outer diameter of the cable L, so that when the cable L is disposed, a thin film of a bottom of the recesses 40b of the second plug 40 could be penetrated by the cable L, thereby tightly matching the cable L with the thin film and enhancing the sealing effect. In practice, the number of the recess 40b could correspond to the number of the cable L, i.e., could be one or plural.

As shown in FIG. 3 and FIG. 8, the cable routing assembly 1 includes a clamping ring 50. An outer wall of the bottom annular base 20 has an annular groove 204. An upper portion of the clamping ring 50 fits around the annular groove 204, and an annular wall of the clamping ring 50 extends away from the annular groove 204 along the axial direction X, so that the clamping ring 50 could close an opening of a gap between the head tube 4 of the bicycle and the cable routing assembly 1.

As shown in FIG. 4 and FIG. 8, the cable routing assembly 1 includes a fitting ring 60 that is rubber and monolithic unit. The fitting ring 60 fits around an outer wall of the cable channel C, so that the first cable groove 102 and the second cable groove 202 are tightly connected. The outer wall of the cable channel C has a slot 1b that is annular and matches with the fitting ring 60, so that when the fitting ring 60 fits around the slot 1b, the fitting ring 60 could be tightly disposed on the outer wall of the cable channel C, thereby preventing the fitting ring 60 from being detached from the outer wall of the cable channel C.

With the aforementioned design, the top annular base 10 and the bottom annular base 20 are a two-piece design, so that the cable L could pass through and be positioned in the second cable groove 202 and then the top annular base 10 is engaged with the bottom annular base 20, thereby solving the problem of a conventional cable routing assembly that is inconducive to assembling. Additionally, as the axial direction X and the channel direction Y are not parallel to each other, the effect of preventing the foreign object, such as moisture or dust, of the external space from entering the cable routing assembly 1 through the cable channel C could be achieved.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A cable routing assembly, disposed on a headset of a bicycle and having a through hole fitting around a steerer tube of the bicycle, comprising:
   a top annular base having a first through hole and a first cable groove; and
   a bottom annular base having a second through hole and a second cable groove; when the top annular base is engaged with the bottom annular base, the top annular base and the bottom annular base jointly form an internal space, and the first cable groove and the second cable groove jointly surround to form a cable channel, wherein the cable channel communicates between an external space and the internal space; the first through hole and the second through hole communicate with each other to form the through hole of the cable routing assembly;
   wherein an axial direction and a channel direction are respectively defined; the through hole of the cable routing assembly extends along the axial direction, and the cable channel extends along the channel direction; the axial direction and the channel direction not parallel to each other.

2. The cable routing assembly as claimed in claim 1, wherein a first angle formed between the axial direction and the channel direction is greater than or equal to 10° and is less than or equal to 170°.

3. The cable routing assembly as claimed in claim 2, wherein the first angle formed between the axial direction and the channel direction is greater than or equal to 45° and is less than or equal to 135°.

4. The cable routing assembly as claimed in claim 1, further comprising a first plug clamped between the first cable groove and the second cable groove, wherein the first plug is disposed in an opening of the cable channel communicating with the external space.

5. The cable routing assembly as claimed in claim 4, wherein the first plug has a through hole communicating between the cable channel and the external space.

6. The cable routing assembly as claimed in claim 1, wherein the top annular base has a third through hole communicating between the external space and the internal space; the bottom annular base has a fourth through hole corresponding to the third through hole and communicating between the external space and the internal space; when the top annular base is engaged with the bottom annular base, the third through hole communicates with the fourth through hole.

7. The cable routing assembly as claimed in claim 6, further comprising a second plug detachably engaged with the third through hole of the top annular base.

8. The cable routing assembly as claimed in claim 7, wherein the second plug blocks the third through hole, and a side of the second plug facing the internal space has at least one recess.

9. The cable routing assembly as claimed in claim 1, further comprising a clamping ring; an outer wall of the bottom annular base has an annular groove; an upper portion of the clamping ring fits around the annular groove, and an annular wall of the clamping ring extends away from the annular groove along the axial direction.

10. The cable routing assembly as claimed in claim 1, further comprising a fitting ring fitting around an outer wall of the cable channel to tightly connect the first cable groove with the second cable groove.

11. The cable routing assembly as claimed in claim 1, further comprising another first cable groove and another second cable groove, wherein when the top annular base is engaged with the bottom annular base, the another first cable groove and the another second cable groove jointly surround to form another cable channel; a second angle formed between the channel direction of the cable channel and another channel direction of the another channel direction is less than or equal to 175°.

12. The cable routing assembly as claimed in claim 1, wherein a side of the bottom annular base away from the top annular base has an extending portion; the extending portion extends away from the top annular base along the axial direction and passes through and urges an inner annular wall of a bearing.

* * * * *